Patented Nov. 8, 1927.

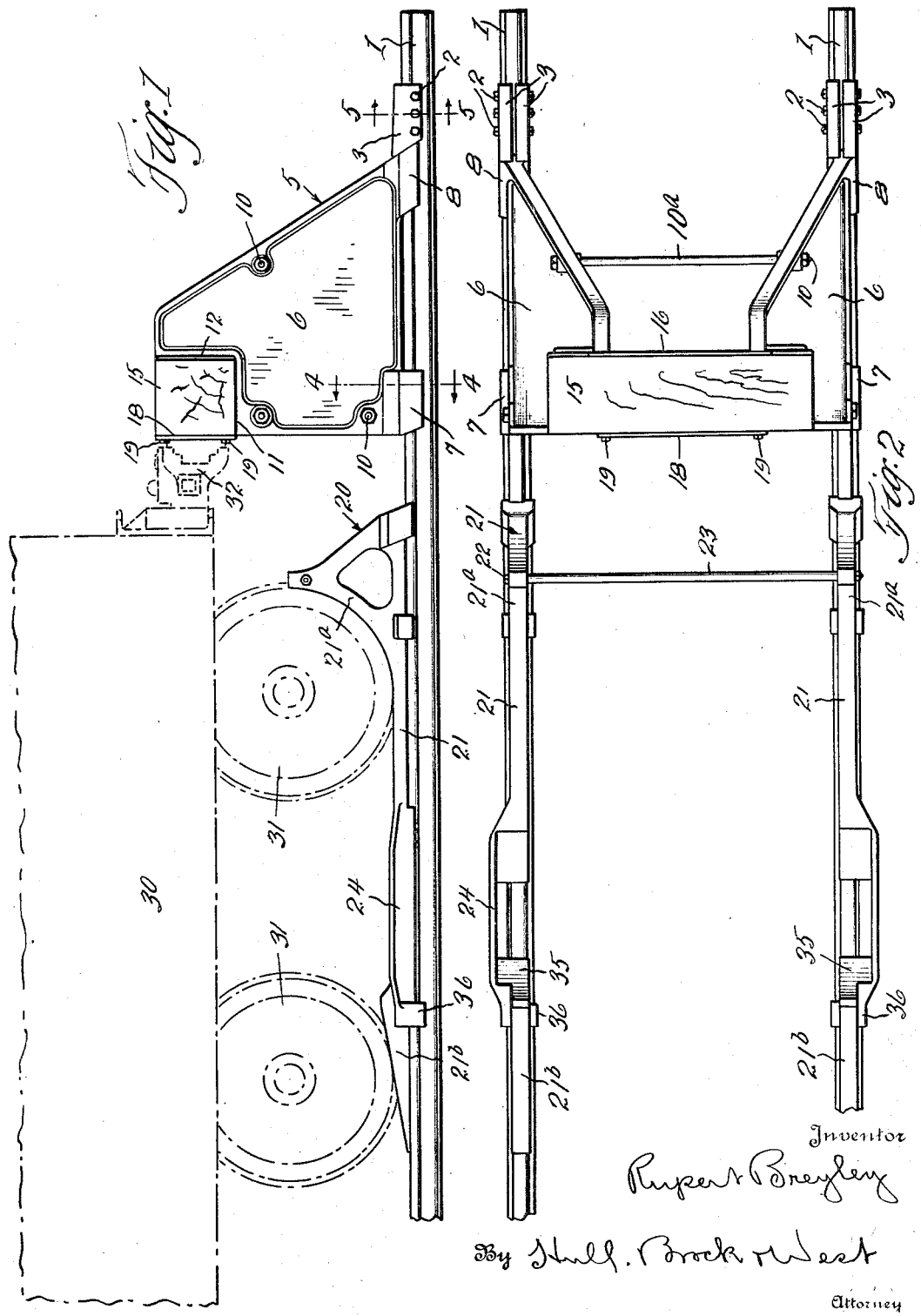

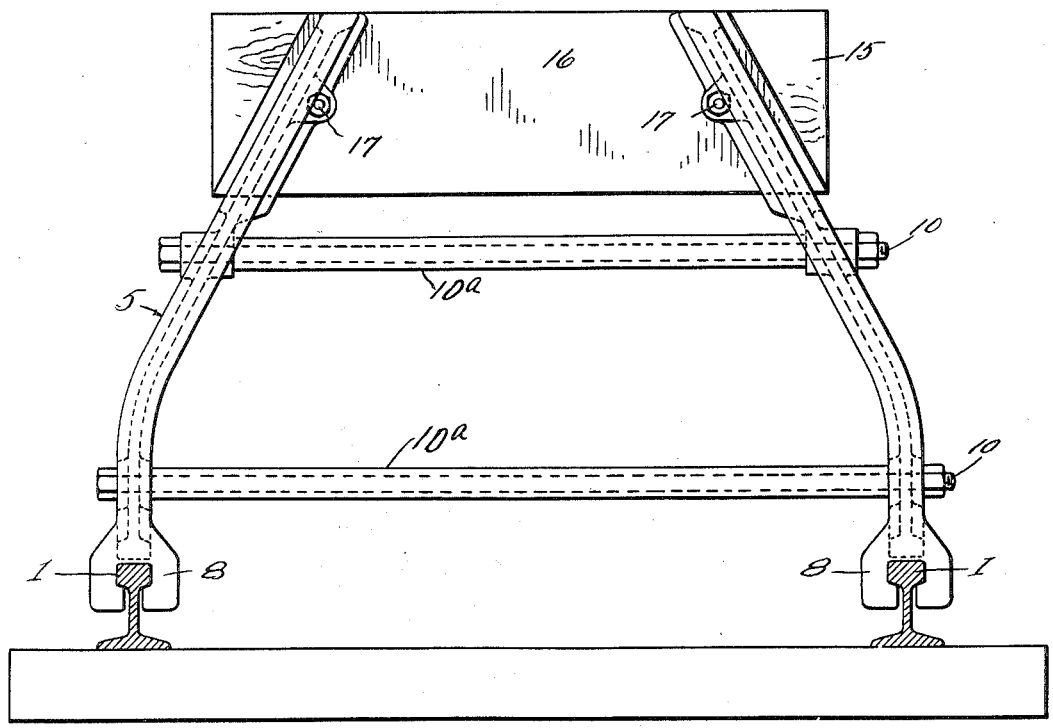
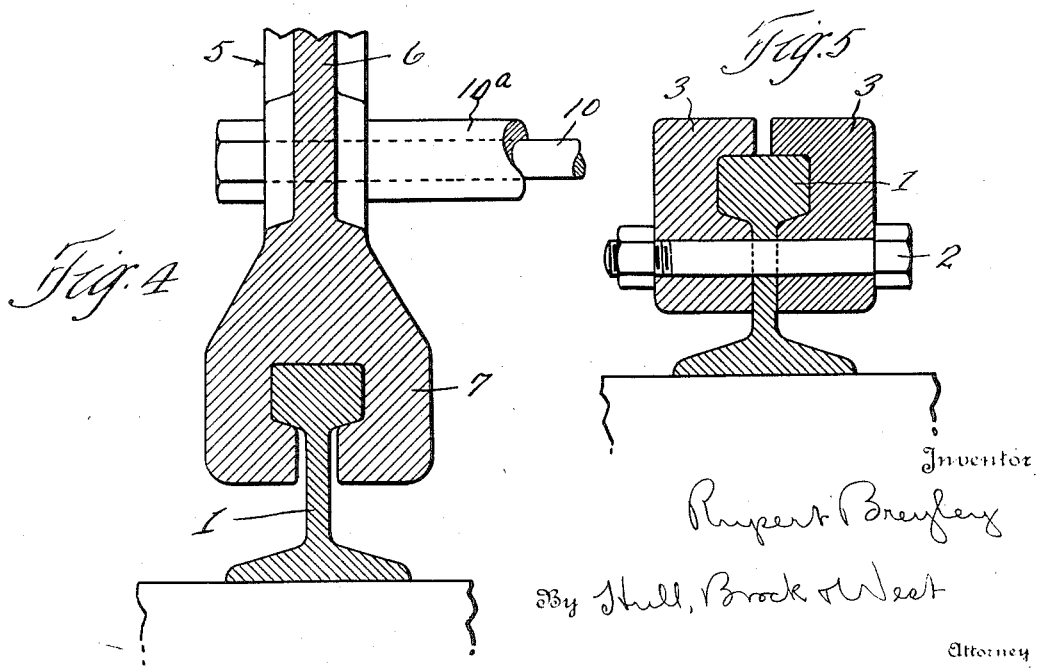

1,648,012

UNITED STATES PATENT OFFICE.

RUPERT BREYLEY, OF PAINESVILLE, OHIO.

STOP FOR ROLLING STOCK.

Application filed December 8, 1926. Serial No. 153,295.

My present invention relates to a car stop outfit involving a car bumper of the type which constitutes the subject matter of my co-pending application Serial No. 19,795, filed April 1, 1925, and a friction shoe or retarder which may be the same as that disclosed and claimed in my Letters Patent No. 1,544,369, issued June 30, 1925, the invention having to do also with improvements in the car bumper per se.

The general objects of the invention are to provide a car stop outfit that may be installed quickly and with little work at the terminal of, or at any position along, a track and that is highly efficient, strong and durable, and which is arranged to coact with the wheels of the rolling stock and also with the body thereof so as to relieve the connections between the truck and body of undue strains when the rolling stock is brought to a stop.

A further object is to provide an outfit of the foregoing nature which, in case of accidental breakage of the connections between the body and truck, will prevent serious results from such an accident by positively stopping both the body and truck.

Other and more specific objects are to improve the construction of the bumper of my earlier application and provide one that, while being highly efficient, is simple of construction, economical of manufacture, and is strong and rugged and well able to withstand the rough usage to which devices of this sort are subjected.

Further objects will appear as I proceed to describe the invention by reference to the accompanying drawings wherein Fig. 1 is a side elevation, and Fig. 2 a plan view, of the car stop outfit; Fig. 3 is a transverse section through the track showing my improved bumper in rear elevation; while Figs. 4 and 5 are sectional details on the respective lines 4—4 and 5—5 of Fig. 1.

The opposed rails of the track are designated 1 and secured to them, as by bolts 2, are stops 3. Mounted upon the rails in advance of the stops 3 is the car bumper which is designated generally by the reference numeral 5 and the same is comprised of opposed housings 6 having rail gripping portions 7 and 8 at their lower front and rear corners, respectively. These portions are designed to span the balls of the rails 1, as best shown in Figs. 3 and 4 and, as will be noted, have inwardly directed lips at their lower ends which engage beneath the balls of the rails. The housing 6 converge upwardly and are secured together by tie rods 10 and are spaced apart by sleeves 10$^a$ that are applied to the tie rods. At their upper forward corners the housings are formed to provide seats 11 and abutments 12, and a bolster or timber 15 rests upon the seats 11. The bolster or timber is reinforced along its rear side by a metal plate 16 which extends between the end portions of the bolster and the abutments 12 and fastening means, such as bolts 17 (Fig. 3), secure the bolster and plate to the housings. A buffer plate 18 is shown as secured to the front face of the bolster, as by lag screws 19.

Slidably mounted upon the track in advance of the bumper 5 is a friction car stop or retarder designated generally by the reference numeral 20 and the same comprises a pair of friction shoes 21 that are mounted upon the opposed rails of the track and are shown as connected together by a tie rod 22 which is equipped with a spacer 23 for holding the shoes in proper relative position. This friction car stop is fully described in my aforesaid Letters Patent, and for the present purpose it may be explained that each shoe 21 incorporates a wheel embracing portion 21$^a$ and a wheel engaging portion or pull back (so called, because of its function) 21$^b$ that are connected together by a laterally offset part 24 which leaves the rail exposed to the rear of the pull back 21$^b$.

In Fig. 1 a car 30 is shown in broken lines with the wheels 31 of one of its trucks resting upon the friction car stop 20, and its coupling 32 engaging the bolster 15 of the bumper 5. This represents the normal conditions in the stoppage of a piece of rolling stock. When the car is moved away from the bumper 5, the advancing wheels will ride off the pull backs 21$^b$ and the following wheels will drop onto the track into the spaces between the pull backs and the wheel embracing portions 21$^a$ and during continued movement of the car the friction car stop will be drawn along the track by reason of the engagement of the rear wheels with the steep sides 35 of the pull backs 21$^b$. The friction car stop will thus be moved along the track until depending portions 36 thereof engage suitable stops, as the usual fish plates, thereby to arrest further movement of the car stop, and the rear wheels will then ride over the pull backs 21$^b$, leaving the stop in a position to be engaged by the next car advancing toward the bumper 5.

As a car approaches the bumper, the wheels of its front truck will ride onto the friction car stop 20, as indicated in Fig. 1, and said stop will slide along the track until the friction between the shoes 21 and the rails overcomes the momentum of the car, or until the coupling 32 of the car strikes the bolster 15. If the car is moving at a relatively high speed, or if the rails are wet, or if for any other reason the friction car stop fails to arrest movement of the heavy truck, and the inertia of the truck is sufficient to shear the king bolt which connects it to the car body, or distort or otherwise disrupt the connection between the truck and the body and the truck continues to advance with respect to the body, it will be brought to a definite stop before further damage can result by the engagement of the advancing end of the friction car stop with the rail embracing portions 7 of the bumper 5.

In placing the outfit upon a track, the friction car stop 20 and the bumper 5 are engaged over the ends of the opposed rails and the stops 3 are then secured to the rails in the desired position by means of the bolts 2.

It will be seen from the foregoing that my invention provides a thoroughly reliable car stop outfit which may be quickly and conveniently installed at any desired location along the track with the minimum trouble and expense and that it acts under normal conditions to stop rolling stock without imposing strains upon the connections between the truck and body and, under abnormal conditions, to avoid serious accident which might otherwise result from breakage of the connections between the truck and the body.

Having thus described my invention, what I claim is:—

1. In combination with a railway track, a stop thereon, a bumper on the track arranged to engage the stop, and a friction car retarder slidable on the track and adapted to be positively stopped under abnormal conditions by engagement with the bumper.

2. In combination with a track for rolling stock, a stop secured to the track, a bumper for the body of the rolling stock mounted upon the rails of the track and arranged to engage the stop, and a friction car retarder slidable on the track in advance of the bumper for engagement by the wheels of the rolling stock and adapted under abnormal conditions to engage the bumper.

3. In combination with a railway track, stops secured to the opposed rails thereof, a bumper mounted upon and supported solely by the rails and arranged to engage said stops, and friction shoes slidable on the rails in advance of the bumper and adapted under abnormal conditions to engage the same.

4. A car bumper comprising two housings having parts designed to embrace the opposed rails of a track, each housing consisting of an integral unit, said housings converging upwardly and having bolster seats adjacent their upper ends, means spacing apart and connecting together said housings, and a bolster supported on said seats.

5. A car bumper comprising two housings designed for application to the opposed rails of a track and having bolster seats adjacent their upper ends, and abutment portions rising from the rear sides of said seats, a bolster on said seats, a reinforcing plate applied to the rear side of the bolster and extending between the bolster and said abutment portions, and fastening means securing the bolster and said reinforcing plate together and in place upon said seats.

6. A car bumper comprising two housings designed for application to the opposed rails of a track, said housings converging upwardly and having horizontal bolster seats adjacent their upper ends and abutment portions rising from the rear sides of said seats, a bolster resting upon the seats, a reinforcing plate applied to the rear side of the bolster and extending between the end portions of the same and the abutment portions of the housings, and fastening means securing the bolster and said plate to said abutment portions.

In testimony whereof, I hereunto affix my signature.

RUPERT BREYLEY.